Sept. 24, 1963

C. E. BRANICK 3,104,422

APPARATUS FOR FORMING PRESHAPED WRAPPERS
FOR PNEUMATIC TIRE CASINGS

Filed June 8, 1962

INVENTOR.
CHARLES E. BRANICK
BY
*Merchant, Merchant & Gould*
ATTORNEYS

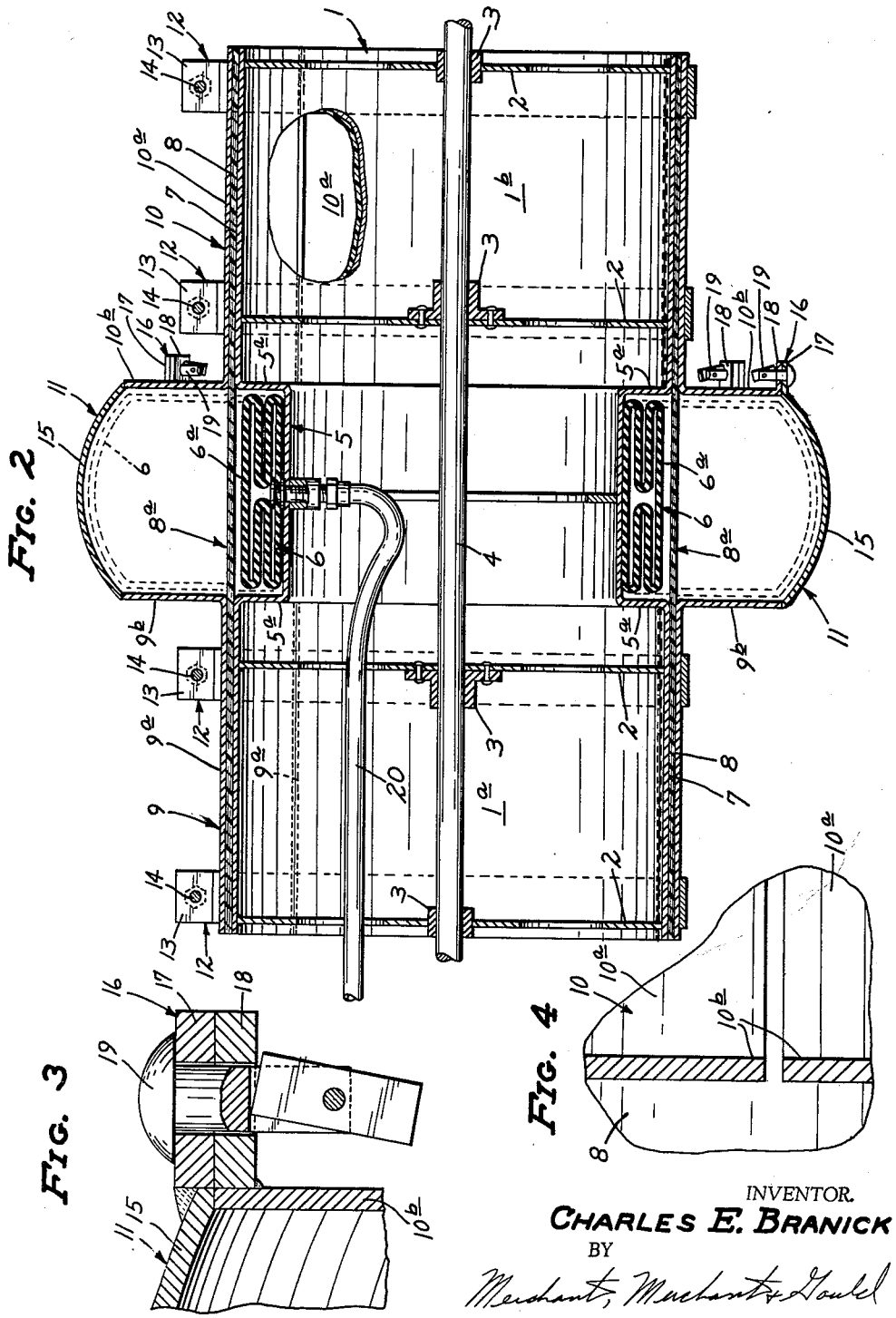

United States Patent Office 3,104,422
Patented Sept. 24, 1963

3,104,422
APPARATUS FOR FORMING PRESHAPED WRAPPERS FOR PNEUMATIC TIRE CASINGS
Charles E. Branick, % Branick Mfg. Co.,
Box 1937, Fargo, N. Dak.
Filed June 8, 1962, Ser. No. 201,085
5 Claims. (Cl. 18—19)

My invention relates to the art of wrapping pneumatic tire casings for shipment and storage and more particularly to apparatus for preforming transparent plastic wrappers of the type disclosed in my copending application Serial No. 154,568, filed November 24, 1961, and entitled "Wrapper for Pneumatic Tire Casings and Method of Forming Same."

The primary object of my present invention is the provision of novel apparatus for the production of preshaped wrappers of the type immediately above described which is highly efficient in its operation and which produces wrappers of more relatively uniform thickness and strength than apparatus and methods heretofore employed.

A further object of my invention is the provision of a device of the type above described which, because of its extreme simplicity, is extremely easy to operate.

A further object of my invention is the provision of apparatus of the type above described which is relatively inexpensive to produce and rugged and durable.

The above and still further objects of my invention will become apparent from the following detailed specification, appended claims and attached drawings.

Referring to the drawings wherein like characters indicate like parts throughout the several views:

FIG. 2 is a view in axial section taken on the line 2—2 of FIG. 1, some parts being broken away;

FIG. 3 is an enlarged fragmentary view in detail taken on the line 3—3 of FIG. 1;

FIG. 4 is an enlarged fragmentary view in section taken on the line 4—4 of FIG. 1.

Figure 1:
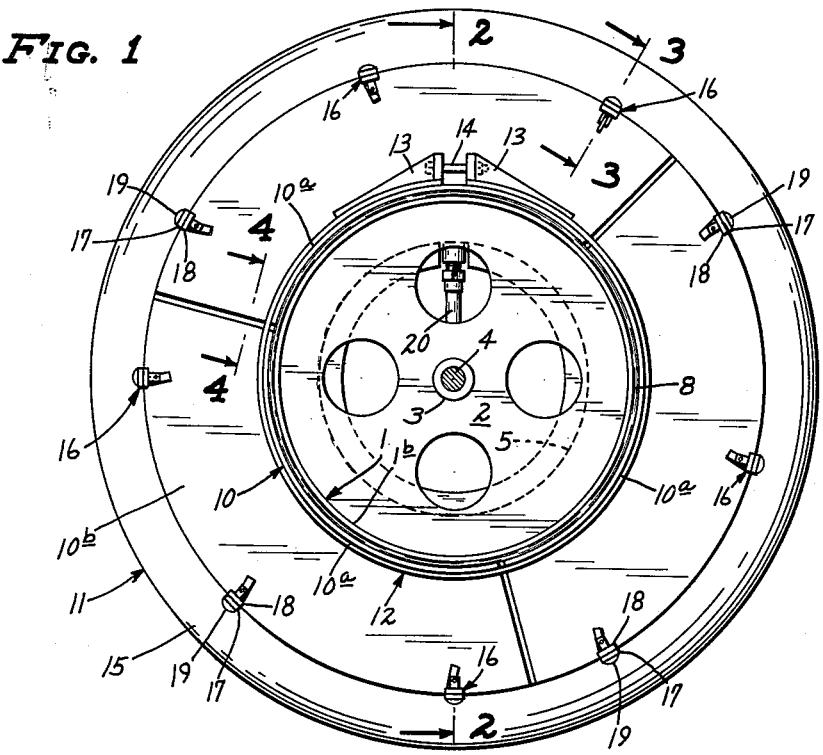
FIG. 1 is a view in end elevation of my novel structure.

Referring with greater particularity to the drawings, the numeral 1 indicates in its entirety an axially elongated cylindrical winding drum. As shown, the drum 1 is tubular and is provided with axially spaced circular supporting spiders 2 which, at their axes, are provided with aligned bearings 3 through which a supporting shaft 4 extends, thus mounting the drum 1 for rotation. Intermediate its end, the drum 1 is formed to define a diametrically reduced radially outwardly opening annular channel 5 in which is received, for a purpose hereinafter to be explained, an expansible and retractable device 6 which is in the nature of an accordion folded tube formed from natural or synthetic rubber or the like. In its retracted position, shown by full lines in FIG. 2, the upper fold 6a of tube 6 is below the plane of the outer peripheral surface 7 of the winding drum 1. The channel 5 actually divides the winding drum 1 into axially spaced independent drum sections 1a and 1b whereby when thermoplastic sheet 8 in strip form is wound upon the surface of the drum 1, the intermediate portion of the convolutions thereof will span the channel 5, as indicated at 8a, in immediately overlying relationship to the tube 6.

For the purpose of securely clamping the convolutions of thermoplastic strip 8 to the peripheral surface 7 of the drum 1, I provide independent identical clamps 9, 10 for the drum sections 1a and 1b, respectively. Each of the clamps 9, 10 comprise cooperating segmental clamping plates 9a, 10a which substantially completely encompass their respective winding drum section 1a, 1b. Each of the segmental clamping plates 9a, 10a, immediately adjacent the opposite side walls 5a of the channel 5 are formed to provide radially outwardly extending flanges 9b, 10b which cooperate to define the opposite side walls of a mold identified in its entirety by the numeral 11. It will be noted that the flanges 9b, 10b are in radial alignment with the side walls 5a of the channel 5 and form radially outward extensions thereof. The clamps 9, 10 are provided with axially spaced grip straps or bands 12, the angularly disposed opposite ends 13 of which are drawn together by means of suitable nut-equipped clamping bolts 14.

To complete the mold 11, I provide an annular closure plate 15 which is slidably received over the outer peripheral edge portions of the segmental flanges 9b and 10b. In this manner a substantially closed annular cavity is formed. For the purpose of removably securing the closure plate 15 in operative position, suitable circumferentially spaced clamps 16 are provided between one side edge of the closure plate 15 and the side wall forming flanges 10b. As shown particularly in FIG. 3, the clamps 16 comprise circumferentially spaced ears 17 on the closure plate 15 and similarly spaced ears 18 on the side wall forming flanges 10b, each of said ears 17, 18 having aligned apertures therein for the reception of conventional quick releasing clamping bolts 19.

Preferably, and as shown, the clamping plate 15 has a cross-sectionally arcuate contour to simulate generally the arcuate cross-sectional contour of the crown portion of a pneumatic tire.

For the purpose of supplying fluid under pressure to the tube 6 I provide a suitable conduit 20.

When a desirable number of convolutions of plastic sheeting 8 have been wound around the peripheral surface 7 of the winding drum 1, the clamps 9, 10 are placed in operative position and the closure plate 15 is in the position of FIG. 2 to complete the mold 11. Thereafter, heated fluid, such as gas or liquid, may be introduced into the tube 6 through the conduit 20 so as to gently but positively exert a yielding bias against the web portion 8a of the thermoplastic sheeting 8 to cause same to assume the shape of the mold 11, as indicated by dotted lines in FIG. 2. After this shape has been attained, it may be found necessary or desirable to run cold fluid through the conduit 20 so as to impart a set to the channel-shaped portion 21 of the wrapper A illustrated in FIG. 5.

Figure 5:
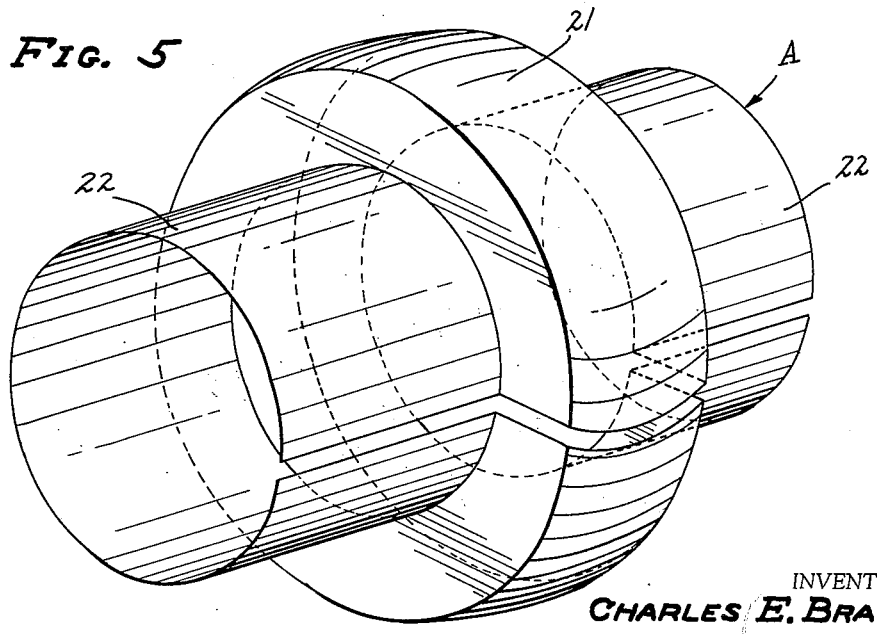
FIG. 5 is a view in perspective of a preshaped wrapper formed with my novel structure.

After a set has been imparted to the plurality of convolutions of the thermoplastic sheet 8, the closure plate 15 and clamps 9, 10 are removed and a plurality of separate wrappers, as shown in FIG. 5, are formed by drawing a knife axially through the plies of sheet 8. The cylindrical sealing flap portion formed by the drum sections 1a and 1b are identified in FIG. 5 by the numeral 22.

My invention has been thoroughly tested and found to be completely satisfactory for the accomplishment of the above objects, and while I have shown a preferred embodiment thereof, I wish it to be understood that same may be capable of modification without departure from the scope and spirit of the appended claims.

What I claim is:

1. Structure of the class described including,
   (a) an axially elongated cylindrical winding drum for thermoplastic sheets in strip form,
   (b) said drum intermediate its ends being formed to define a diametrically reduced radially outwardly opening annular channel which divides said drum into axially spaced drum sections,
   (c) means on opposite sides of said channel and in immediately adjacent relationship thereto for clamping the thermoplastic sheets wound on said drum to the peripheral surfaces thereof, (d) an expansible and retractable device in said channel normally below the plane of said winding drum, (e) and means for imparting expanding movements to said device to diametrically expand the convolutions of thermoplastic sheeting overlying said channel to a predetermined diameter and shape.

2. Structure of the class described including, (a) an axially elongated generally cylindrical winding drum for thermoplastic sheets in strip form, (b) said drum intermediate its ends being formed to define a diametrically reduced radially outwardly opening annular channel which divides said drum into axially spaced drum sections, (c) means on opposite sides of said channel for clamping the thermoplastic sheets wound on said drum to the peripheral surface thereof, (d) a diametrically enlarged radially inwardly opening mold in radial alignment with the recess in said winding drum, (e) an expansible and retractable device in said channel normally below the plane of said winding drum, (f) and means for imparting expanding and retracting movements to said expansible and retractable device to force the convolutions of thermoplastic sheeting intermediate said channel and said mold to assume the shape of said mold.

3. The structure defined in claim 2 in which said first-mentioned means comprises independent clamps for each of said drum sections, said clamps each including a plurality of segmental clamping plates, said clamping plates adjacent the opposite sides of said recess being formed to provide radially outwardly projecting flanges which cooperate to define opposite side walls of said mold.

4. The structure defined in claim 3 in which said mold further comprises an annular closure plate and in further combination with means releasably securing said closure plate to the flanges which define one of the side walls of said mold.

5. The structure defined in claim 4 in which said closure plate has a cross-sectionally arcuate contour conforming generally to the crown portion of a pneumatic tire.

No references cited.